US012560223B2

(12) United States Patent
Dods et al.

(10) Patent No.: US 12,560,223 B2
(45) Date of Patent: **\*Feb. 24, 2026**

(54) SYSTEM AND METHOD FOR A CAPTIVE SPROCKET IN AN ENGINE

(71) Applicant: Cummins Inc., Columbus, IN (US)

(72) Inventors: James A. Dods, Barnard Castle (GB); Michael J. Cooper, North Yorkshire (GB); Paul A. Leggott, Darlington (GB); Graham Dowson, Bridlington (GB)

(73) Assignee: Cummins Inc., Columbus, IN (US)

( \* ) Notice: Subject to any disclaimer, the term of this patent is extended or adjusted under 35 U.S.C. 154(b) by 110 days.

This patent is subject to a terminal disclaimer.

(21) Appl. No.: 18/224,435

(22) Filed: Jul. 20, 2023

(65) Prior Publication Data

US 2023/0358299 A1 Nov. 9, 2023

Related U.S. Application Data

(63) Continuation of application No. 17/057,178, filed as application No. PCT/IB2019/054303 on May 23, 2019, now Pat. No. 11,746,859.

(Continued)

(51) Int. Cl.
*F16H 7/06* (2006.01)
*F02B 67/06* (2006.01)
(Continued)

(52) U.S. Cl.
CPC .............. *F16H 7/06* (2013.01); *F16H 55/30* (2013.01); *F01L 1/022* (2013.01); *F01L 1/047* (2013.01);
(Continued)

(58) Field of Classification Search
CPC ............. F16H 7/06; F16H 55/30; F02B 67/06
See application file for complete search history.

(56) References Cited

U.S. PATENT DOCUMENTS 2,202,794 A \* 5/1940 Hanson ..................... F16H 3/50
475/307
2,412,457 A \* 12/1946 Harrison ............. F01L 13/0063
123/90.16

(Continued)

FOREIGN PATENT DOCUMENTS

CN 1452692 A 10/2003
CN 1633546 A 6/2005
(Continued)

OTHER PUBLICATIONS

Second Chinese Office Action for Chinese patent application No. 201980033517.1, mailed Jul. 7, 2022.
(Continued)

*Primary Examiner* — Anna M Momper
*Assistant Examiner* — Mark K Buse
(74) *Attorney, Agent, or Firm* — Faegre Drinker Biddle & Reath LLP

(57) ABSTRACT

The present disclosure provides a captive sprocket system for an engine, comprising: a sprocket including a first sprocket gear, a second sprocket gear and a retaining disc having a diameter and a thickness; a cylinder block having a bore with a central opening and a plurality of threaded bosses, the plurality of threaded bosses together forming an axial support surface and a radial location surface, the axial support surface and the radial location surface being sized to receive the retaining disc of the sprocket to support and locate the sprocket; and a plurality of captivation screws configured to be received by the plurality of threaded bosses, each captivation screw having a head with a lower surface (Continued)

which, when the captivation screw is received by a threaded boss, overlies the retaining disc and retains the sprocket in the bore.

17 Claims, 13 Drawing Sheets

Related U.S. Application Data

(60) Provisional application No. 62/675,356, filed on May 23, 2018.

(51) Int. Cl.
*F16H 55/30* (2006.01)
*F01L 1/02* (2006.01)
*F01L 1/047* (2006.01)

(52) U.S. Cl.
CPC ........ *F02B 67/06* (2013.01); *F16H 2055/306* (2013.01)

(56) References Cited

U.S. PATENT DOCUMENTS

| | | | |
|---|---|---|---|
| 2,639,147 A | | 5/1953 | Fairbanks |
| 2,695,485 A | * | 11/1954 | Krause ................... A01D 41/04 |
| | | | 56/13.3 |
| 2,849,997 A | | 9/1958 | Kravits |
| 4,869,708 A | | 9/1989 | Hoffmann et al. |
| 5,445,568 A | | 8/1995 | Fukuzawa et al. |
| 5,495,776 A | * | 3/1996 | Allen ........................ F01L 1/02 |
| | | | 123/90.15 |
| 5,630,401 A | | 5/1997 | Binversie et al. |
| 5,645,024 A | | 7/1997 | Allen et al. |
| 6,302,002 B1 | * | 10/2001 | Defer ........................ F01L 1/46 |
| | | | 81/484 |
| 6,435,994 B1 | | 8/2002 | Friedmann et al. |
| 6,468,173 B1 | | 10/2002 | Jeong |
| 6,953,022 B1 | | 10/2005 | Itsuki et al. |
| 6,966,290 B2 | | 11/2005 | Utsumi et al. |
| 8,863,711 B2 | | 10/2014 | Allen |
| 9,958,050 B2 | * | 5/2018 | Kolloch ................... F16H 55/48 |
| 10,428,774 B2 | | 10/2019 | Bandy et al. |
| 11,746,859 B2 | | 9/2023 | Dods et al. |
| 2005/0076869 A1 | | 4/2005 | Utsumi et al. |
| 2005/0153813 A1 | * | 7/2005 | Serkh ..................... B60K 25/00 |
| | | | 475/324 |
| 2006/0201464 A1 | | 9/2006 | Kira |
| 2006/0280620 A1 | | 12/2006 | Kleinbeck et al. |

| | | | |
|---|---|---|---|
| 2008/0264365 A1 | | 10/2008 | Kohrs et al. |
| 2011/0005500 A1 | * | 1/2011 | Asari ...................... F01L 1/026 |
| | | | 123/508 |
| 2014/0224194 A1 | * | 8/2014 | Barnes ...................... F01P 5/04 |
| | | | 123/41.44 |
| 2016/0003340 A1 | | 1/2016 | Crump et al. |
| 2016/0097440 A1 | | 4/2016 | Geibel et al. |
| 2017/0096030 A1 | * | 4/2017 | Engel .................. B60B 27/0015 |
| 2017/0167454 A1 | * | 6/2017 | Bandy ................... F02M 37/06 |
| 2017/0335811 A1 | | 11/2017 | Turner et al. |
| 2018/0340465 A1 | | 11/2018 | Mikawa |
| 2020/0300334 A1 | | 9/2020 | Kashiwa |
| 2021/0207690 A1 | * | 7/2021 | Dods ........................ F16H 55/30 |

FOREIGN PATENT DOCUMENTS

| | | | |
|---|---|---|---|
| CN | 201041119 Y | | 3/2008 |
| CN | 103266972 A | | 8/2013 |
| CN | 204691899 U | | 10/2015 |
| CN | 205089479 U | | 3/2016 |
| CN | 106286054 | * | 1/2017 |
| CN | 106286054 A | | 1/2017 |
| CN | 107023426 A | | 8/2017 |
| CN | 107709736 A | | 2/2018 |
| DE | 2505876 A1 | | 8/1976 |
| DE | 10017005 A1 | | 10/2000 |
| DE | 20313014 U1 | | 12/2004 |
| DE | 112014000744 T5 | | 10/2015 |
| DE | 102014014720 A1 | | 4/2016 |
| DE | 102017003390 A1 | | 10/2017 |
| EP | 1431572 A1 | | 6/2004 |
| EP | 1701008 A2 | | 9/2006 |
| GB | 2330188 A | | 4/1999 |
| GB | 2347174 A | | 8/2000 |
| GB | 2489461 A | | 10/2012 |
| KR | 10-2001-0027026 A | | 4/2001 |
| KR | 2007-0051524 A | | 5/2007 |
| WO | 2005/026541 A1 | | 3/2005 |
| WO | 2009/089265 A2 | | 7/2009 |
| WO | 2012/160968 A1 | | 11/2012 |
| WO | 2014/010653 A1 | | 1/2014 |
| WO | 2016/069260 A1 | | 5/2016 |

OTHER PUBLICATIONS

International Preliminary Report on Patentability received for PCT Patent Application No. PCT/IB2019/054303, mailed on Dec. 3, 2020, 9 pages.
International Search Report and Written Opinion issued by the ISA/US, Commissioner for Patents, dated Dec. 5, 2019, for International Application No. PCT/IB2019/054303; 11 pages.

* cited by examiner

SYSTEM AND METHOD FOR A CAPTIVE SPROCKET IN AN ENGINE

RELATED APPLICATIONS

The present application is a continuation of and claims priority to U.S. patent application Ser. No. 17/057,178, filed Nov. 20, 2020, which is a U.S. national stage of and claims priority to International Patent Application No. PCT/IB2019/054303, filed May 23, 2019, which claims priority to U.S. Provisional Patent Application No. 62/675,356 entitled "SYSTEM AND METHOD FOR A CAPTIVE SPROCKET IN AN ENGINE," filed on May 23, 2018, the entire disclosures of which are expressly incorporated herein by their reference.

TECHNICAL FIELD

The present invention relates generally to a sprocket that drives an engine component, and more particularly to a system and method for mounting a sprocket on an engine to permit removal of the engine component driven by the sprocket.

BACKGROUND

In many engine manufacturing processes, an engine component such as a fuel pump or air compressor powered by a sprocket driven by a crankshaft must be installed prior to installing a chain system connected to the engine component and a flywheel housing. This results in a sub-optimal assembly sequence. In many engine servicing and maintenance situations, the engine component cannot be removed without first removing the engine from the vehicle, then removing the flywheel housing and chain assemblies coupled to the sprocket. This process results in significant expense in terms of labor and engine down time. Thus, it is desirable to provide a system and method to address these issues.

SUMMARY

In one embodiment, the present disclosure provides a captive sprocket system for an engine, comprising: a sprocket including a first sprocket gear, a second sprocket gear and a retaining disc having a diameter and a thickness; a cylinder block having a bore with a central opening and a plurality of threaded bosses, the plurality of threaded bosses together forming an axial support surface and a radial location surface, the axial support surface and the radial location surface being sized to receive the retaining disc of the sprocket to support and locate the sprocket; and a plurality of captivation screws configured to be received by the plurality of threaded bosses, each captivation screw having a head with a lower surface which, when the captivation screw is received by a threaded boss, overlies the retaining disc and retains the sprocket in the bore; wherein the thickness of the retaining disc is less than a distance between the lower surfaces of the captivation screw heads and the axial support surface formed by the plurality of threaded bosses and the diameter of the retaining disc is less than a diameter of the radial location surface formed by the plurality of threaded bosses, thereby permitting rotation of the sprocket within the bore. In one aspect of this embodiment, the sprocket includes a central opening having a diameter sized to receive a drive shaft of an engine component, the engine component being one of a fuel pump or an air compressor. A variant of this aspect further comprises a retaining nut configured to be threaded onto a threaded end of the drive shaft, the retaining nut having an outer diameter that is larger than the diameter of the sprocket central opening. In another aspect, the first sprocket gear is configured to mesh with a first chain assembly coupled to a camshaft of the engine. In a variant of this aspect, the second sprocket gear is configured to mesh with a second chain assembly driven by a crankshaft of the engine. Another variant further comprises a flywheel housing having an access opening to provide access to the retaining nut when the sprocket is retained in the bore. In a further variant, the flywheel housing further includes an access cover that removably covers the access opening. In another aspect of this embodiment, at least one of the first sprocket gear, the second sprocket gear and the retaining disc is formed from a first piece of material and at least another of the first sprocket gear, the second sprocket gear and the retaining disc is formed from a second piece of material that is separate from the first piece of material.

In another embodiment, the present disclosure provides a method for removing a fuel pump from an engine, comprising: removing an access cover of a flywheel housing; removing a retaining nut coupled to a drive shaft of the fuel pump, the drive shaft extending through a central opening in a sprocket coupled to a first chain assembly that drives a camshaft of the engine; and removing the fuel pump from the engine without removing the flywheel housing, the first chain assembly or the sprocket. In one aspect of this embodiment, the retaining nut has an outer diameter that is larger than a diameter of the central opening in the sprocket. In another aspect, the sprocket includes a first sprocket gear to mesh with the first chain assembly and a second sprocket gear configured to mesh with a second chain assembly driven by a crankshaft of the engine. In a variant of this aspect, the sprocket includes a retaining disc, at least one of the first sprocket gear, the second sprocket gear and the retaining disc is formed from a first piece of and at least another of the first sprocket gear, the second sprocket gear and the retaining disc is formed from a second piece of material that is separate from the first piece of material. In another variant, the sprocket includes a retaining disc having a diameter and a thickness, the diameter of the retaining disc being less than a diameter of a radial location surface formed by a plurality of threaded bosses formed on the engine and the thickness of the retaining disc being less than a distance between lower surfaces of a plurality of captivation screws coupled to the plurality of threaded bosses and an axial support surface formed by the plurality of threaded bosses.

In yet another embodiment, the present disclosure provides an engine, comprising: a sprocket including a retaining disc having a diameter and a thickness; a bore with a central opening; a plurality of threaded bosses disposed adjacent the bore, the plurality of threaded bosses together forming an axial support surface and a radial location surface, the axial support surface and the radial location surface being sized to receive the retaining disc of the sprocket to support and locate the sprocket; and a plurality of captivation screws configured to be received by the plurality of threaded bosses, each captivation screw having a head with a lower surface which, when the captivation screw is received by a threaded boss, overlies the retaining disc and retains the sprocket in the bore; wherein the thickness of the retaining disc is less than a distance between the lower surfaces of the captivation screw heads and the axial support surface formed by the plurality of threaded bosses and the diameter of the retaining disc is less than a diameter of the radial location surface formed by the plurality of threaded bosses, thereby permitting rotation of the sprocket within the bore. One aspect of this embodiment further comprises a camshaft and a first chain assembly coupled to the camshaft, the sprocket including a first sprocket gear configured to mesh with the first chain assembly to drive rotation of the camshaft. A variant of this aspect further comprises a crankshaft and a second chain assembly coupled to the crankshaft, the sprocket including a second sprocket gear configured to mesh with the second chain assembly, the crankshaft driving rotation of the sprocket via the second chain assembly. Another aspect further comprises a cylinder block, the bore and the plurality of threaded bosses being formed on the cylinder block. Still another aspect of this embodiment further comprises an engine component having a drive shaft, the sprocket including a central opening having a diameter sized to receive the drive shaft. A variant of this aspect further comprises a retaining nut configured to be threaded onto a threaded end of the drive shaft, the retaining nut having an outer diameter that is larger than the diameter of the sprocket central opening. Another variant further comprises a flywheel housing having an access opening to provide access to the retaining nut when the sprocket is retained in the bore.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
FIG. 1 is a perspective view of a sprocket according to one embodiment of the present disclosure.
Figure 1:
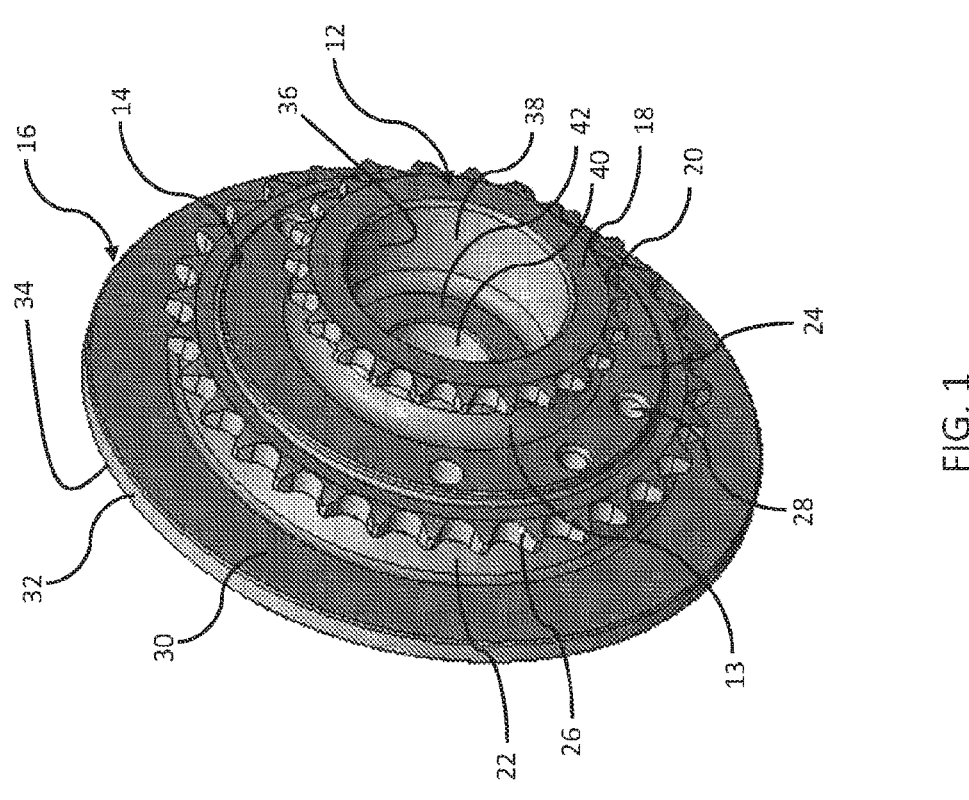

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

FIG. 1 depicts a sprocket according to one embodiment of the present disclosure. Sprocket 10 generally includes a first sprocket gear 12, a second sprocket gear 14 and a retaining disc 16. First sprocket gear 12 includes a substantially cylindrical body 13 having an upper surface 18 and a plurality of teeth 20 formed about its periphery. Second sprocket gear 14 is disposed axially between first sprocket gear 12 and retaining disc 16 and includes a substantially cylindrical body 22 having an upper surface 24 and a plurality of teeth 26 formed about its periphery. Teeth 26 of second sprocket gear 14 form a diameter that is greater than a diameter formed by teeth 20 of first sprocket gear 12. Second sprocket gear 14 further includes a plurality of openings 28 configured to cooperate with an extraction tool used to separate sprocket 10 from a pump to which is may be connected, as described below. Retaining disc 16 includes an upper surface 30, an outer surface 32 defining a diameter of retaining disc 16, and a lower surface 34. The distance between upper surface 30 and lower surface 34 define a thickness of retaining disc 16. The diameter of retaining disc 16 is larger than the diameter formed by teeth 26 of second sprocket gear 14. First sprocket gear 12 and second sprocket gear 14 include an inner surface 36 defining a central bore 38. Central bore 38 is in communication with a central opening 40 of sprocket 10 and includes a shoulder 42 surrounding central opening 40.

It should be understood that in different embodiments, sprocket 10 may be formed from one piece of material or may consist of two or more components. For example, in one embodiment retaining disc 16 may be manufactured separately from first sprocket gear 12 and second sprocket gear 14. This configuration may have the benefit of preventing retaining disc 16 from interfering with the tooth hardening process of the teeth of the sprocket gears. In another example, retaining disc 16 may be manufactured separately to permit careful control of the thickness and diameter of the retaining disc. In still another embodiment, retaining disc 16 may be hard mounted to the cylinder block with running clearance at a permanent assembly interface between the retaining disc and the sprocket gears. In this example, retaining disc 16 may be clamped in place (by the captivation screws described below) and the sprocket gears may rotate freely relative to the retaining disc. In a further example, retaining disc 16, first sprocket gear 12 and second sprocket gear 14 are manufactured separately and assembled together for use.

Figure 2:
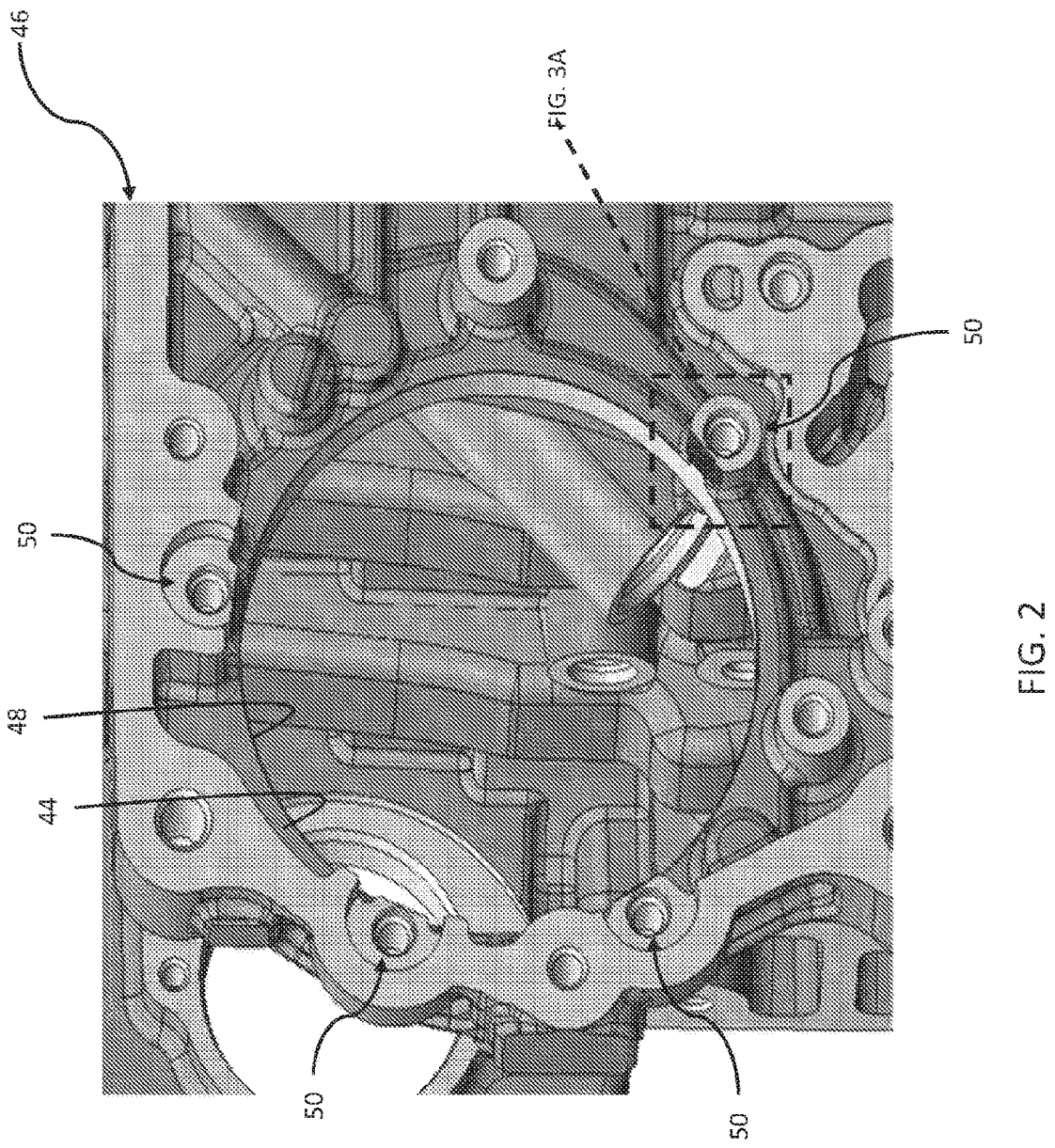
FIG. 2 is a perspective view of a portion of a cylinder block.

Referring now to FIG. 2, sprocket 10 is configured to be positioned within a bore 44 formed in a cylinder block 46 of an engine. Bore 44 forms a central opening 48. A plurality of threaded bosses 50 are disposed within bore 44 and spaced around the periphery of central opening 48. Threaded bosses 50 are shown in detail in FIGS. 3A and 3B.

Figure 3B:
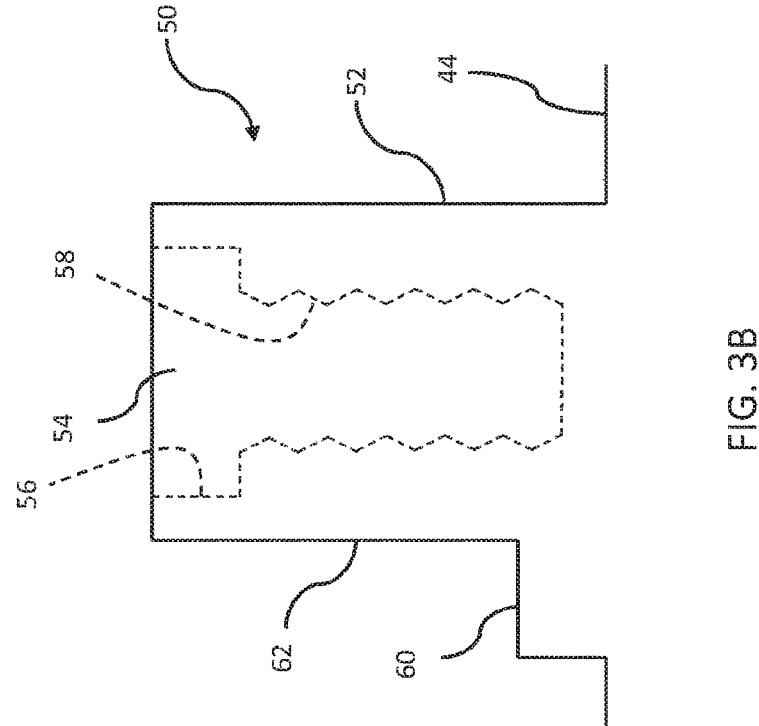
FIG. 3B is a side view of the threaded boss of FIG. 3A.
Figure 3A:
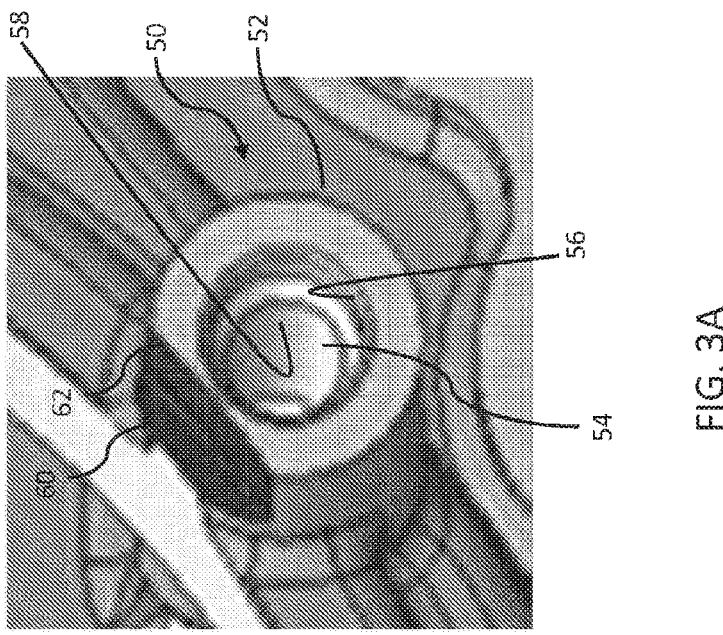
FIG. 3A is a perspective view of a threaded boss according to one aspect of the present disclosure.

As shown in FIGS. 3A and 3B, each threaded boss 50 includes a substantially cylindrical body 52 with a screw opening 54. Screw opening 54 includes a countersunk hole 56 in communication with a threaded bore 58 sized to receive a captivation screw as is further described below. Each threaded boss 50 further includes an axial support wall 60 and a radial location wall 62. As best shown in FIG. 2, axial support walls 60 of the plurality of threaded bosses 50 lie in a common plane and together form an axial support surface for sprocket 10. Radial location walls 62 of the plurality of threaded bosses 50 define a diameter that is larger than and concentric with central opening 48, and together form a radial location surface.

Figure 4:
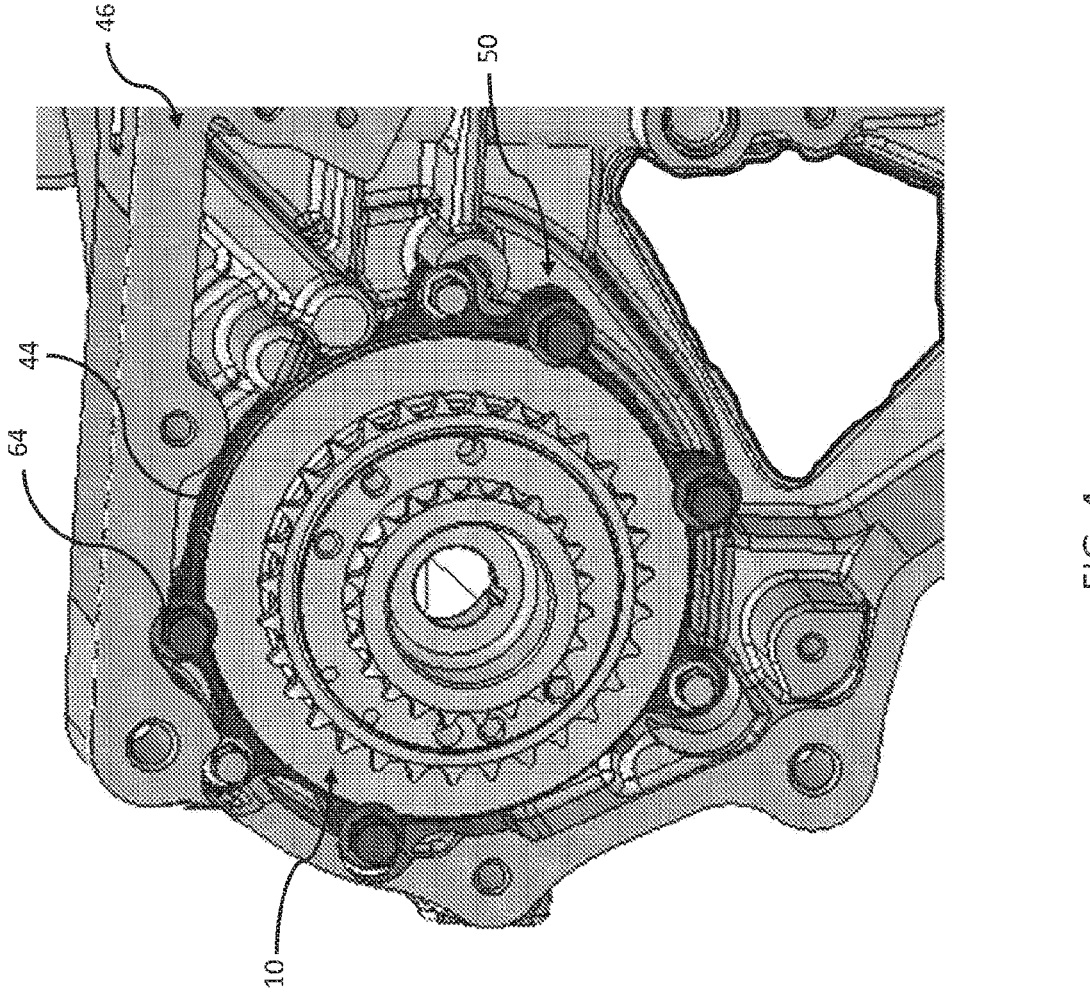
FIG. 4 is a perspective view of the sprocket of FIG. 1 supported within a bore of the cylinder block of FIG. 2.

FIG. 4 shows sprocket 10 installed in bore 44 of cylinder block 46. As shown, a plurality of captivation screws 64 are installed in the plurality of threaded bosses 50. In this manner, sprocket 10 is retained within bore 44 as is further described below.

Figure 5:
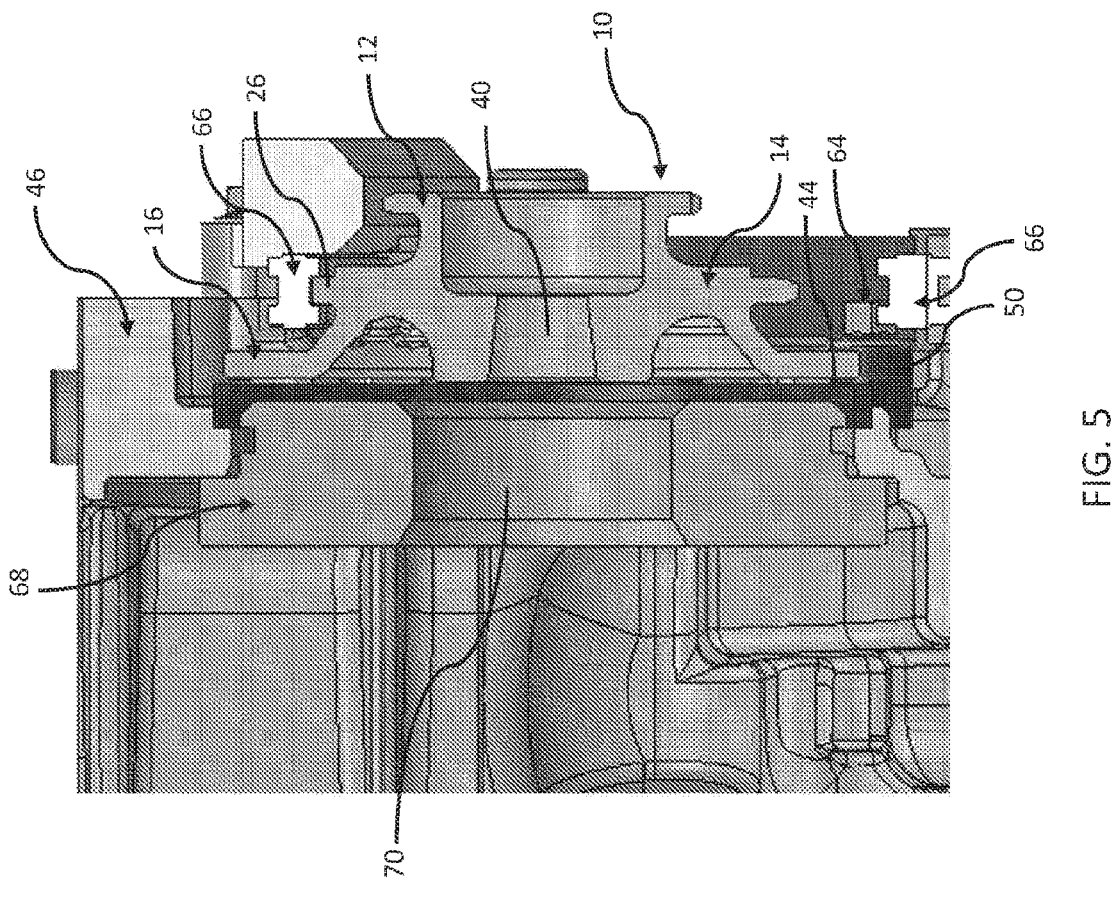
FIG. 5 is a side, cross-sectional view of the sprocket of FIG. 1 supported within a bore of the cylinder block of FIG. 2 with a chain assembly installed.

Referring now to FIG. 5, a cross-sectional view of sprocket 10 installed in bore 44 of cylinder block 46 is shown. One captivation screw 64 is shown installed in one threaded boss 50. A chain assembly 66 is shown in operational engagement with teeth 26 of second sprocket gear 14. Additionally, an adapter 68 is shown mounted to cylinder block 46 for permitting installation of any of a plurality of different engine components such as a fuel pump (described herein) or an air compressor. Adaptor 68 includes a central opening 70 which permits a drive shaft (described below) of the engine component to pass through adaptor 68, central opening 48 of bore 44, and central opening 40 of sprocket 10. As is further described below, the drive shaft of the engine component is secured to sprocket 10 and powered for rotation (to drive operation of the engine component) by rotation of sprocket 10.

Figure 6:
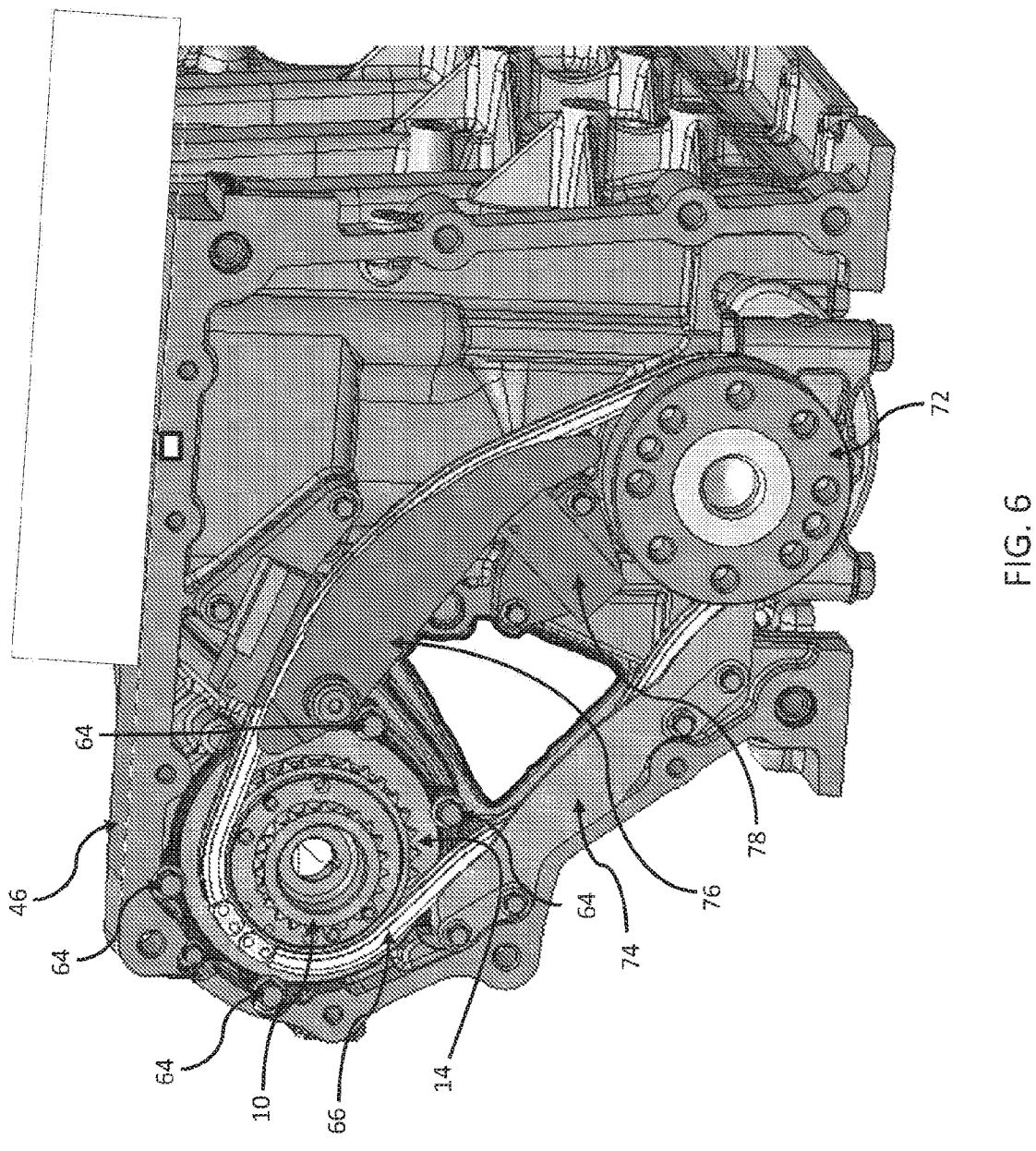
FIG. 6 is a perspective view of the sprocket of FIG. 1 supported within a bore of the cylinder block of FIG. 2 with a chain assembly installed.

FIG. 6 is another view of sprocket 10 installed on cylinder block 46 with chain assembly 66 coupled between a drive gear assembly 72 of the engine crankshaft (not shown) and second sprocket gear 14 of sprocket 10. As shown, chain assembly 66 includes a first chain guide 74, a second chain guide 76 and a chain tensioner 78 as is known in the art. These components are normally covered by a flywheel housing (described below) when the engine is assembled for operation. It should be noted that the fuel pump (i.e., an engine component driven by rotation of sprocket 10 in this example) is not shown installed into cylinder block 46 in FIGS. 5 and 6.

Figure 7:
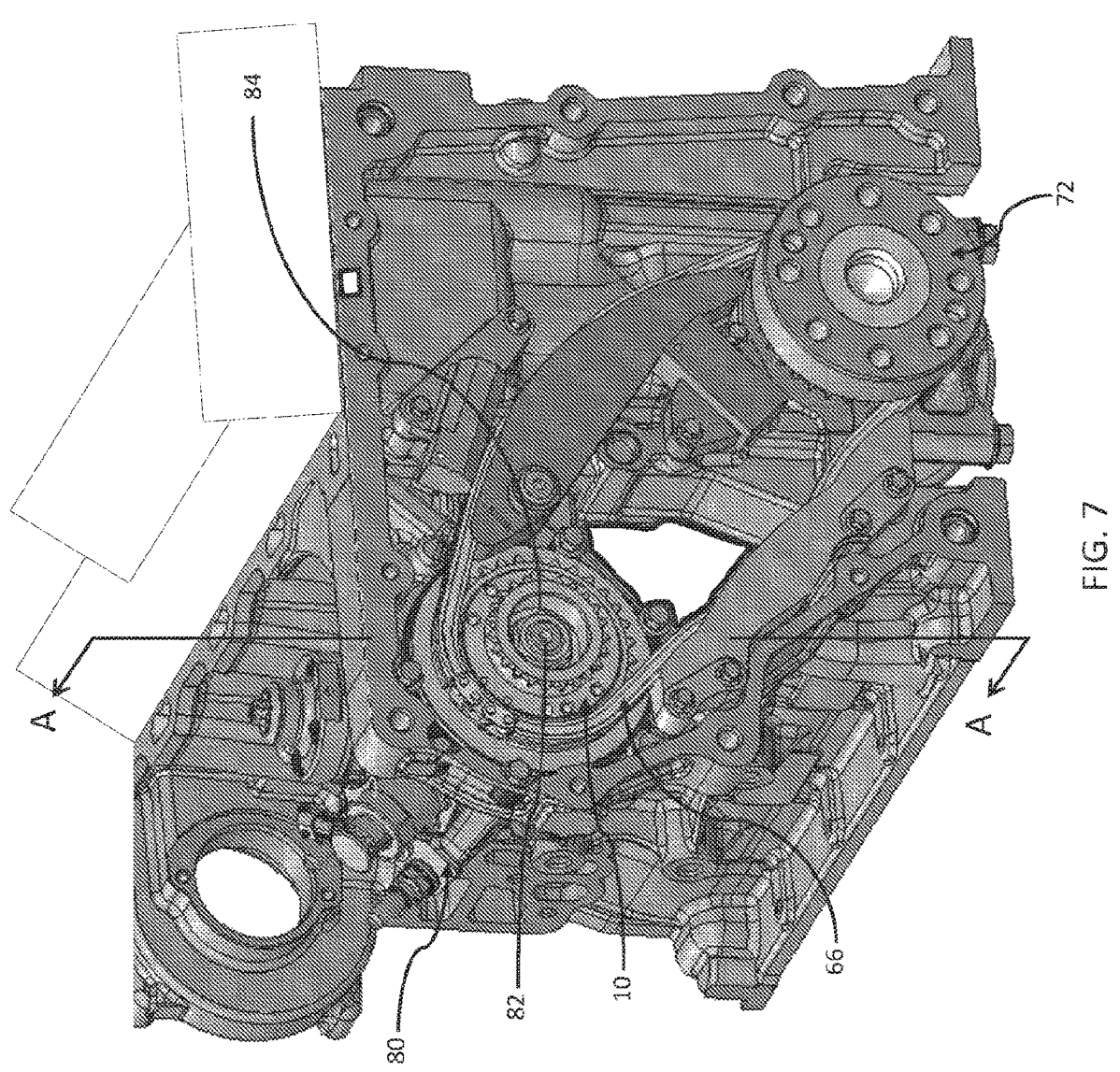
FIG. 7 is a perspective view similar to FIG. 6 but showing a fuel pump installed in the cylinder block.

FIG. 7 is a similar view to that of FIG. 6, but with fuel pump 80 installed. As shown, a drive shaft 82 of fuel pump 80 extends through central opening 40 of sprocket 10 and is coupled for rotation with sprocket 10 by a retaining nut 84 as is further described below with reference to FIGS. 8, 9A and 9B. As is known in the art, rotation of the crankshaft of the engine causes rotation of drive gear assembly 72, which powers rotation of sprocket 10 through chain assembly 66. As sprocket 10 is connected to drive shaft 82 of fuel pump 80 by retaining nut 84, rotation of sprocket 10 causes rotation of drive shaft 82, which powers operation of fuel pump 80.

Figure 8:
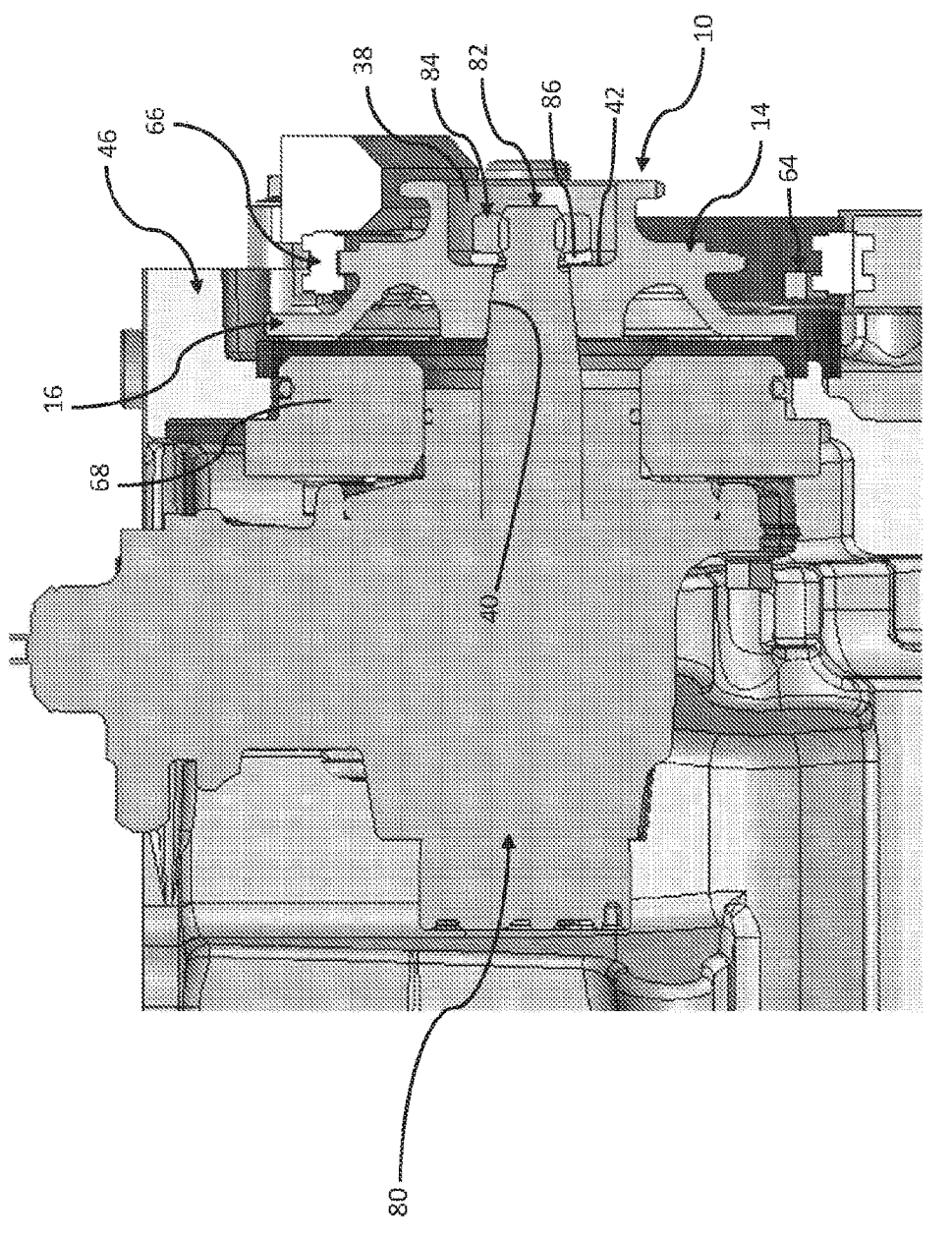
FIG. 8 is side, cross-sectional view taken along line A-A of FIG. 7.
Figures 9A, 9B:
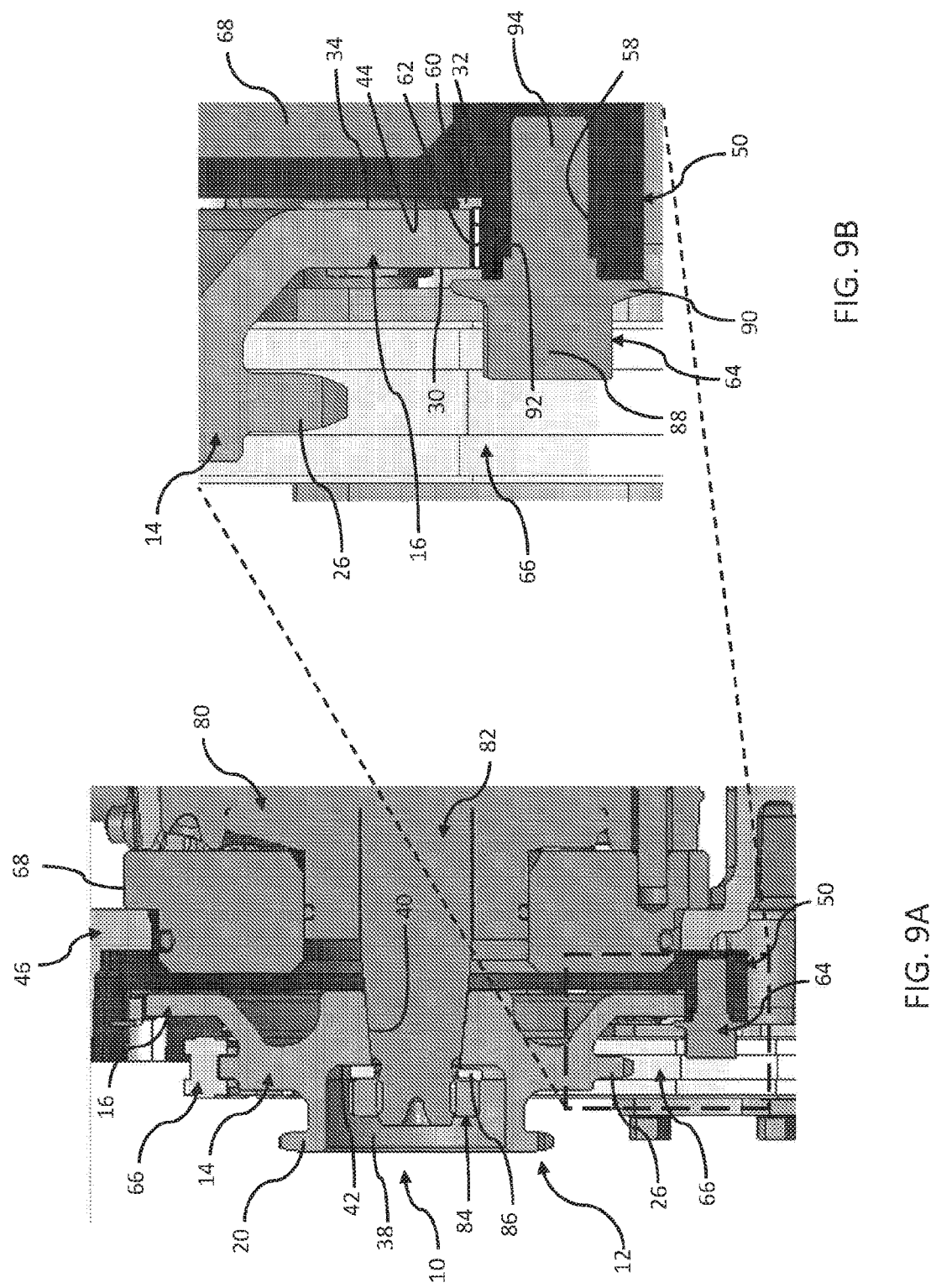
FIG. 9A is a side, cross-sectional view similar to FIG. 8.
FIG. 9B is an enlarged view of a portion of FIG. 9A.

Referring now to FIGS. 8, 9A and 9B, drive shaft 82 of fuel pump 80 is shown extending through central opening 40 of sprocket 10 and into central bore 38. Drive shaft 82 includes a threaded end that mates with internal threads of retaining nut 84. When retaining nut 84 is tightened onto drive shaft 82, retaining nut 84 compresses a washer 86 against shoulder 42 of central bore 38, thereby coupling drive shaft 82 to sprocket 10. In certain embodiments, the washer 86 is omitted.

As best shown in FIG. 9B, when sprocket 10 is supported by drive shaft 82 of fuel pump 80, sprocket is positioned for free rotation within bore 44 of cylinder block 46. Captivation screw 64 includes a head 88 having a radial flange 90 extending therefrom. Flange 90 has a lower surface 92. Captivation screw 64 also includes a threaded body 94 that is received by threaded bore 58 of screw opening 54 of threaded boss 50 (FIG. 3B). As shown, when captivation screw 64 is fully seated in threaded boss 50, the thickness of retaining disc 16 between upper surface 30 and lower surface 34 is less than the distance between lower surface 92 of flange 90 and axial support wall 60 of threaded boss 50. Additionally, the diameter of retaining disc 16 as defined by outer surface 32 is less than the diameter of the radial location surface formed by radial location wall 62 of threaded bore 50.

Figure 10:
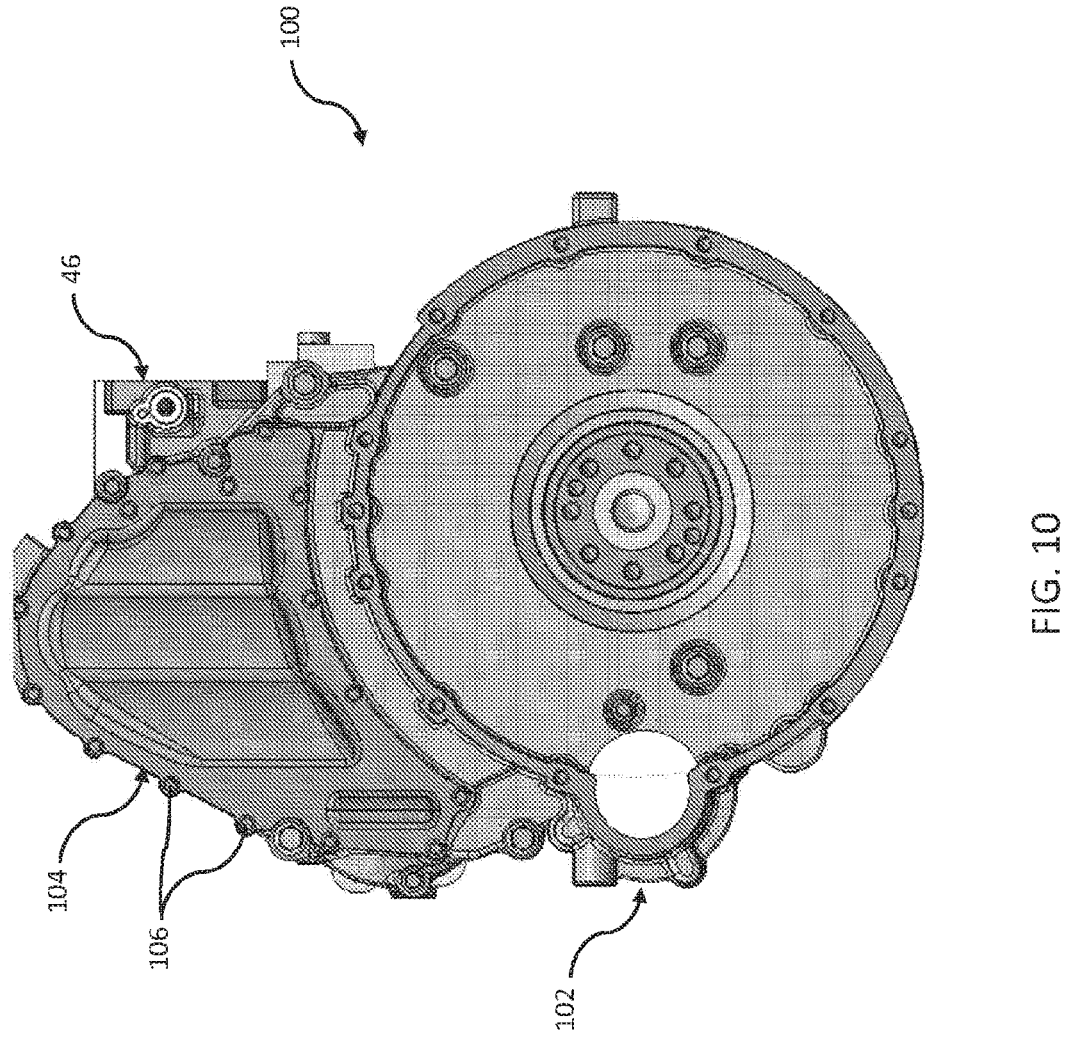
FIG. 10 is a side plan view of a flywheel housing according to one embodiment of the present disclosure.
Figure 11:
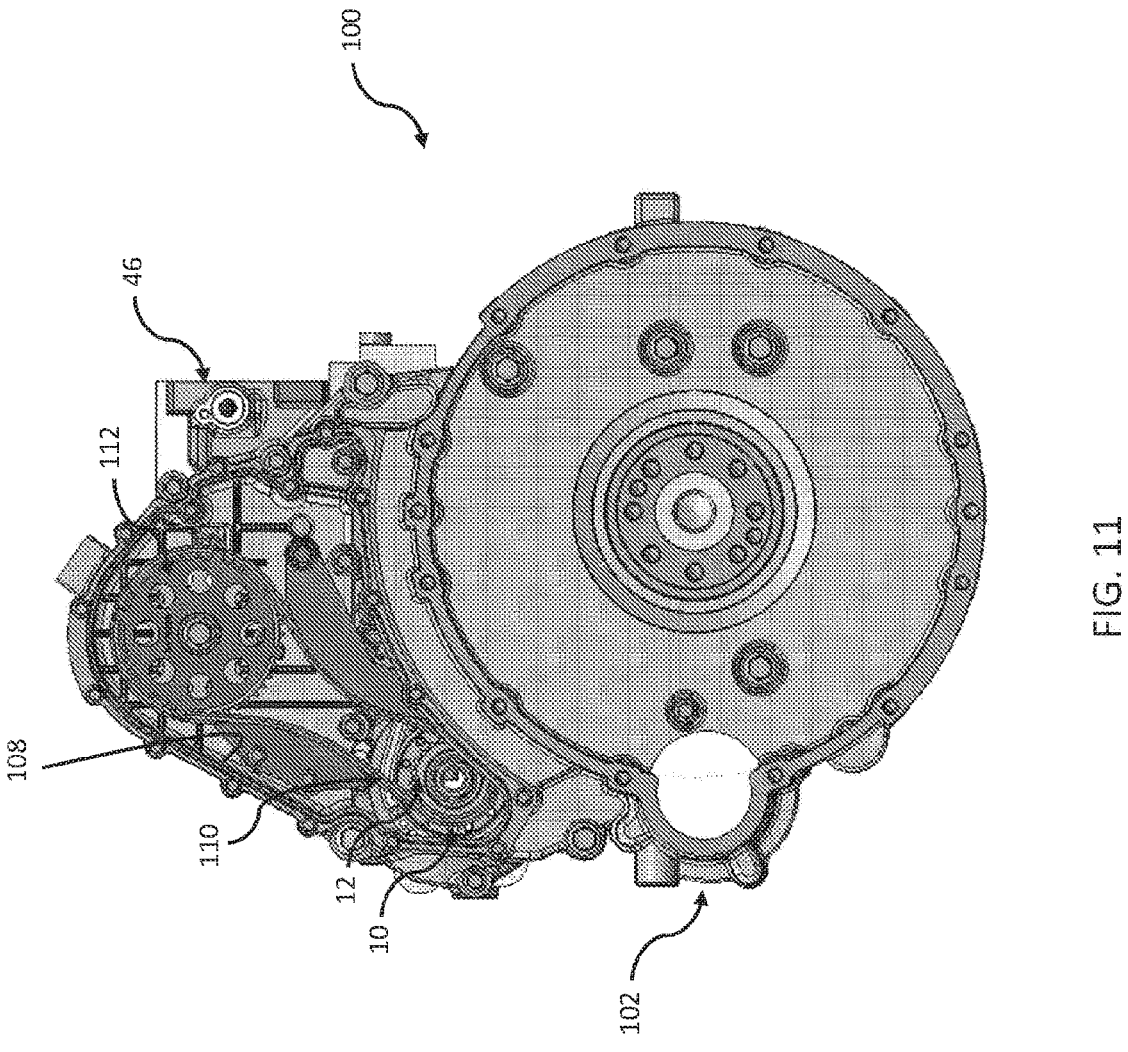
FIG. 11 is a side plan view of the flywheel housing of FIG. 10 with an access cover removed.

Referring now to FIGS. 10 and 11, a flywheel housing 100 is shown having a main body 102 and an access cover 104. Access cover 104 is removable by removing fasteners 106, and exposes a recess 108. Flywheel housing 100 is shown in FIGS. 10 and 11 installed on cylinder block 46. In FIG. 11, access cover 104 is removed from flywheel housing 100. Removal of access cover 104 exposes sprocket 10 to permit removal of fuel pump 80 as described below. By providing access to sprocket 10 (and in particular retaining nut 84), access cover 104 enables removal of fuel pump 80 without the need to remove flywheel housing 100 or the second chain assembly 110 which is disposed within recess 108 and extends between first sprocket gear 12 and a camshaft gear 112 which drives a camshaft (not shown) as a result of rotation of sprocket 10. In prior art designs, fuel pump 80 could only be removed by removing the flywheel, the flywheel housing, the chain assembly driving the camshaft, the sprocket and then the fuel pump. This resulted in significant expense and downtime of the engine.

Figure 12:
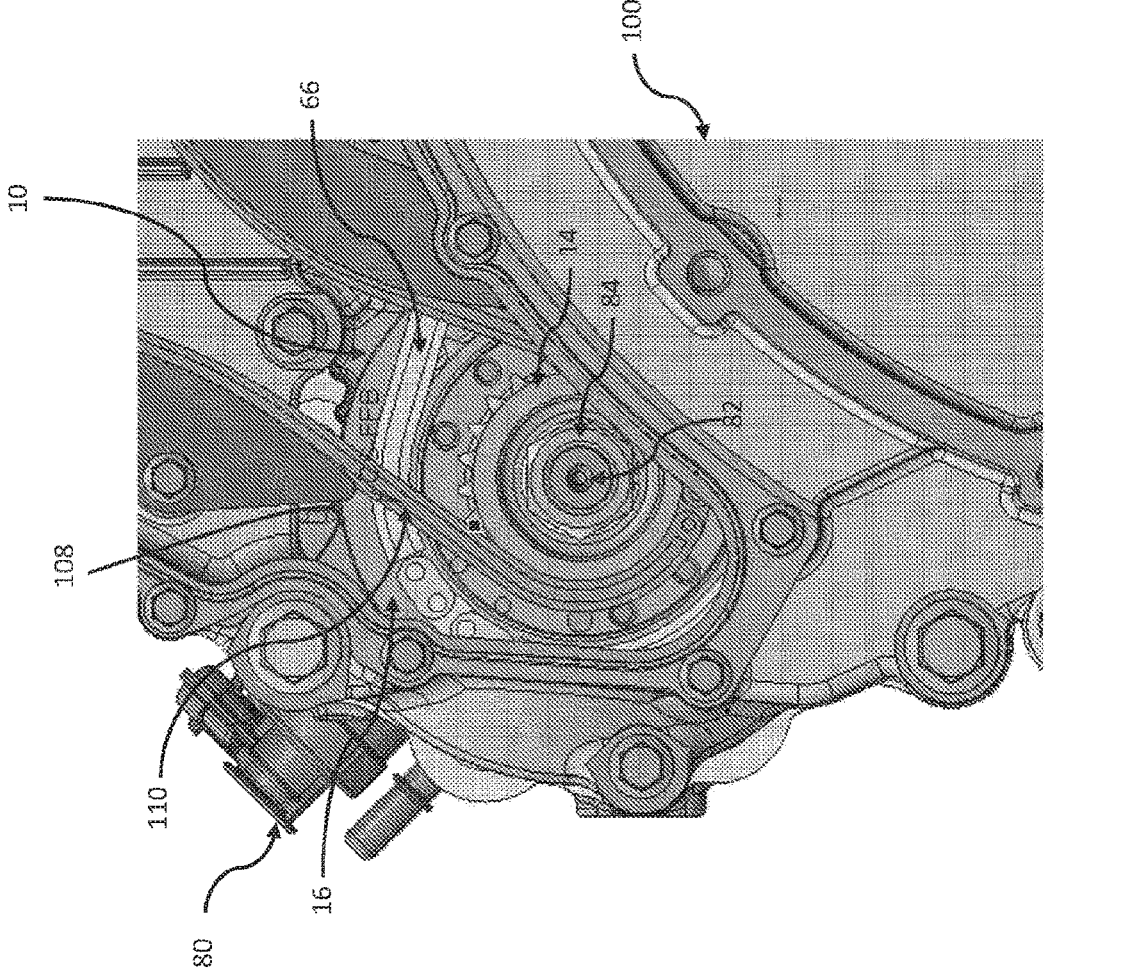
FIG. 12 is an enlarged view of a portion of FIG. 11 with a fuel pump installed in the cylinder block.
Figure 13:
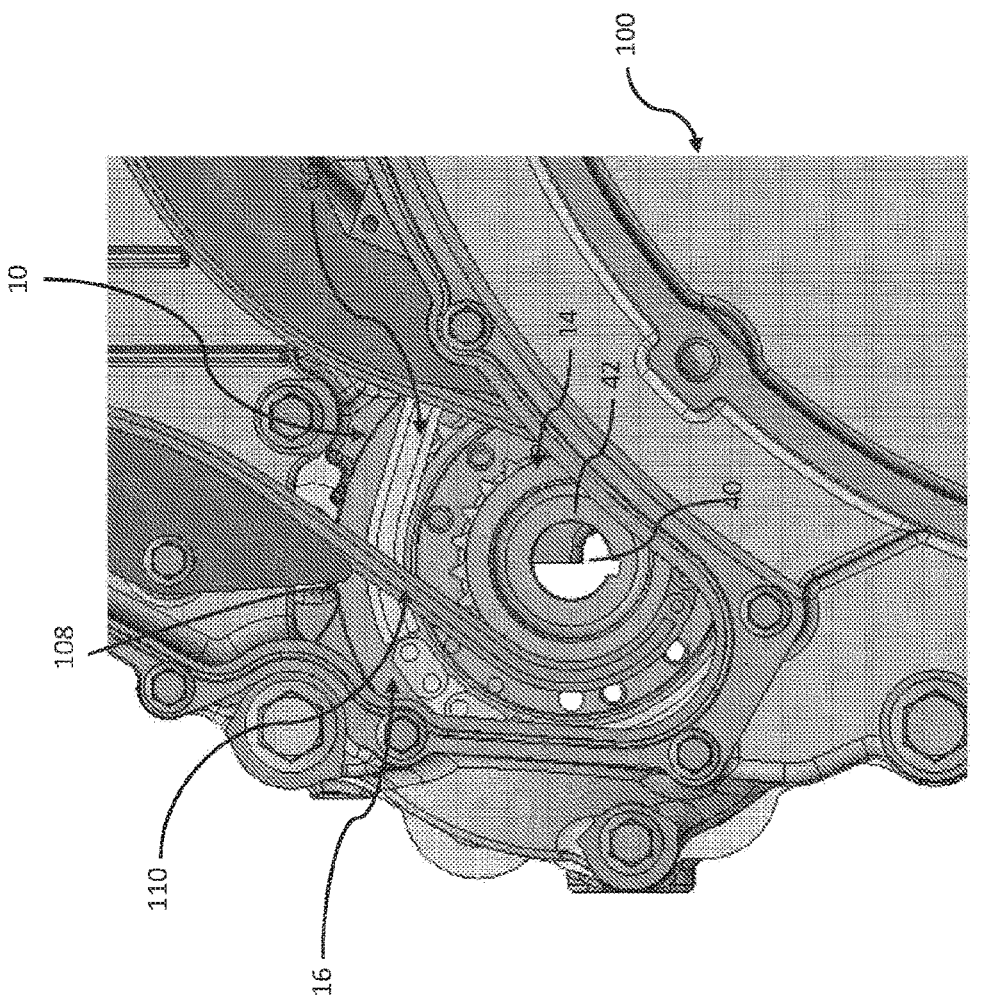
FIG. 13 is a view similar to FIG. 12 with the fuel pump removed.

In FIG. 12, access cover 104 of flywheel housing 100 is removed and fuel pump 80 is installed in cylinder block 46. Retaining nut 84 is attached to drive shaft 82 of fuel pump 80. To remove fuel pump 80, chain assembly 110 and chain assembly 66 may remain in place, and a wrench or other suitable tool is used to unthread retaining nut 84 from drive shaft 82. Fuel pump 80 may then be removed from cylinder block 46 as shown in FIG. 13.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

We claim:

1. A method for removing a chain-driven engine component from an engine, the method comprising:
    removing an access cover of a flywheel housing from a flywheel housing body to thereby expose a sprocket in a recess formed by the flywheel housing to permit removal of the chain-driven engine component without removing each of the flywheel housing, a first chain, and the sprocket;
    removing a fastener that is coupled to a driveshaft of the chain-driven engine component, the driveshaft extending through a central opening in the sprocket that is coupled to the first chain; and removing the chain-driven engine component from the engine without removing the first chain or the sprocket.

2. The method of claim 1, wherein a camshaft of the engine is driven via driving the first chain and the sprocket is driven by a second chain that is couple to an engine crankshaft of the engine, and wherein removing the access cover of the flywheel housing further permits removal of the chain-driven engine component without removing the second chain.

3. The method of claim 1, wherein the fastener is a retaining nut that threadedly engages the driveshaft, and wherein the step of removing the fastener that is coupled to the driveshaft of the chain-driven engine component includes unthreading the retaining nut from the driveshaft.

4. The method of claim 1, wherein the sprocket is positioned for free rotation within an engine bore of the engine when the sprocket is coupled to the driveshaft, and wherein the step of removing the fastener that is coupled to the driveshaft of the chain-driven engine component includes securing the sprocket for removal of the fastener.

5. A sprocket assembly, comprising:
    a sprocket having a sprocket body with an inner surface that defines a sprocket bore through which a driveshaft of an engine component is receivable into secured engagement with the sprocket such that the sprocket is permitted to transmit rotation to the driveshaft for powered operation of the engine component by rotation of sprocket, each of the sprocket and the engine component is designed for installation on an engine; and
    a retaining disc that is configured to retain the sprocket at the engine when the sprocket assembly is installed on the engine such that the engine component is removable from the engine without removing the retaining disc; and
    one or more captivation screws that are designed to be installed on the engine component within a threaded boss such that a threaded distal end is received by the threaded boss and a proximal head of the captivation screw overlies a portion of the sprocket, retaining the sprocket in the engine bore.

6. The sprocket assembly of claim 5, further comprising a first chain that is operatively connectible to the sprocket and is designed for driving a camshaft of the engine.

7. The sprocket assembly of claim 6, wherein the sprocket includes a first sprocket gear to mesh with the first chain and a second sprocket gear to mesh with a second chain to be driven by a crankshaft of the engine.

8. The sprocket assembly of claim 7, wherein at least one of the first sprocket gear, the second sprocket gear, and the retaining disc is formed from a first piece of material and at least another of the first sprocket gear, the second sprocket gear and the retaining disc is formed from a second piece of material that is separate from the first piece of material.

9. The sprocket assembly of claim 5, wherein the retaining disc is received in an engine bore of the engine when the retaining disc is installed on the engine.

10. The sprocket assembly of claim 9, wherein the sprocket comprises one or more sprocket gears, the sprocket assembly further comprising a retaining nut that is designed to couple the sprocket to the driveshaft when the driveshaft is received in the sprocket bore such that the one or more sprocket gears is allowed to freely rotate within the engine bore.

11. The sprocket assembly of claim 10, wherein the engine component is removable from the engine by removing only the retaining nut when each of the engine component and the sprocket assembly are installed on the engine.

12. The sprocket assembly of claim 5, wherein the retaining disc has a retaining disc diameter that is less than a diameter of a radial location surface that is formable by a plurality of threaded bosses formed on the engine, and wherein the retaining disc has a retaining disc thickness that is less than a distance between lower surfaces of a plurality of captivation screws when coupled to the plurality of threaded bosses and an axial support surface that is formable by the plurality of threaded bosses.

13. An engine comprising:

an engine component that includes a driveshaft that drives operation of the engine component through rotation of the driveshaft;

a camshaft that includes a camshaft gear;

a first chain that engages the camshaft gear for rotation of the camshaft;

a sprocket that includes one or more sprocket gears with at least one of the one or more sprocket gears engaging the first chain such that the sprocket rotates together with the camshaft gear, wherein the sprocket receives the driveshaft of the engine component to be rotatably secured with the driveshaft, and wherein the sprocket is retainable at the engine with removal of the engine component; and a cylinder block that has a cylinder block body that defines a cylinder block bore, wherein the sprocket is installed at the cylinder block to be positioned in the cylinder block bore, and wherein the sprocket is retained in the cylinder block bore via one or more captivation screws that are installed around the cylinder block bore so as to overlie a portion of the sprocket.

14. The engine of claim 13, further comprising a flywheel housing having a flywheel housing body that defines a flywheel housing recess that houses the sprocket so as to provide access to the sprocket for removal of the engine component such that the engine component is removable from the engine without removing at least two of the flywheel housing, the first chain, and the sprocket.

15. The engine of claim 14, further comprising a retaining nut that is secured to the driveshaft to thereby couple the sprocket to the driveshaft such that the engine component is removable from the engine without removing each of the flywheel housing, the first chain, and the sprocket.

16. The engine of claim 14, wherein the sprocket is driven by a second chain that is coupled to an engine crankshaft of the engine, and wherein removal of the engine component is permitted without removing at least three of the flywheel housing, the first chain, the sprocket, and the second chain.

17. The engine of claim 13, wherein the sprocket further includes a retaining disc that permits the one or more sprocket gears to rotate freely relative to the retaining disc, wherein the sprocket is retained at the engine via retention of the retaining disc at the engine when the engine component is removed.

* * * * *